(12) United States Patent
Kobayashi (10) Patent No.: US 11,513,243 B2
(45) Date of Patent: Nov. 29, 2022

(54) SCATTER ESTIMATION METHOD, SCATTER ESTIMATION PROGRAM, AND POSITRON CT DEVICE HAVING SAME INSTALLED THEREON

(71) Applicant: Shimadzu Corporation, Kyoto (JP)

(72) Inventor: Tetsuya Kobayashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 641 days.

(21) Appl. No.: 16/492,430

(22) PCT Filed: Mar. 9, 2017

(86) PCT No.: PCT/JP2017/009531
§ 371 (c)(1),
(2) Date: Sep. 9, 2019

(87) PCT Pub. No.: WO2018/163362
PCT Pub. Date: Sep. 13, 2018

(65) Prior Publication Data
US 2020/0012002 A1     Jan. 9, 2020

(51) Int. Cl.
*G01T 1/29*     (2006.01)
*G06T 11/00*    (2006.01)

(52) U.S. Cl.
CPC .......... *G01T 1/2985* (2013.01); *G06T 11/005* (2013.01)

(58) Field of Classification Search
CPC .... G01T 1/2985; G01T 1/1647; G06T 11/005
See application file for complete search history.

(56) References Cited

U.S. PATENT DOCUMENTS

| | | | |
|---|---|---|---|
| 7,129,496 B2 | 10/2006 | Stearns et al. | |
| 7,397,035 B2 | 7/2008 | Watson | |
| 8,265,365 B2 | 9/2012 | Panin | |
| 8,809,791 B2 | 8/2014 | Olivier et al. | |

(Continued)

FOREIGN PATENT DOCUMENTS

WO     2013/175352 A     11/2013

OTHER PUBLICATIONS

Grootoonk et al. "Correction for scatter in 30 brain PET using a dual energy window method," Phys. Med. Biol. 41, 1996, pp. 2757-2774.

(Continued)

*Primary Examiner* — David P Porta
*Assistant Examiner* — Djura Malevic
(74) *Attorney, Agent, or Firm* — Muir Patent Law, PLLC (57) ABSTRACT

In the scatter estimation method of the present invention, Step S1 (first TOF projection data generation) and Step S4 (non-TOF scatter estimation algorithm) are performed, and Step S2 (second TOF projection data generation) and Step S3 (calculation of TOF direction distribution ratio) are performed, and Step S5 (calculation of TOF scatter projection data) is performed. A distribution ratio is obtained from the second TOF projection data measured in a scattered radiation energy window (low energy window). Since the target of distribution is non-TOF scatter projection data in a reconstruction data energy window (standard energy window), post-distribution TOF scatter projection data is obtained as approximate TOF scatter projection data in the reconstruction data energy window (standard energy window), and scatter estimation can be accurately performed.

7 Claims, 5 Drawing Sheets

(56) References Cited

U.S. PATENT DOCUMENTS

| | | | | |
|---|---|---|---|---|
| 8,913,810 | B2* | 12/2014 | Panin | G06T 11/003 |
| | | | | 382/128 |
| 9,155,514 | B2* | 10/2015 | Panin | G06T 11/006 |
| 9,706,972 | B1* | 7/2017 | Ahn | A61B 6/025 |
| 10,354,417 | B2* | 7/2019 | Zhou | G06T 7/0012 |
| 11,054,534 | B1* | 7/2021 | Nutt | A61B 6/4266 |
| 11,061,151 | B2* | 7/2021 | Bai | G01T 1/2985 |
| 11,069,098 | B2* | 7/2021 | Dwivedi | A61B 6/037 |
| 11,288,847 | B2* | 3/2022 | Watson | G01T 1/2985 |
| 11,300,695 | B2* | 4/2022 | Nutt | G01T 1/2985 |
| 2007/0167716 | A1* | 7/2007 | Kinahan | A61B 6/4014 |
| | | | | 600/407 |
| 2009/0324042 | A1* | 12/2009 | Laurence | G01T 1/2985 |
| | | | | 382/131 |
| 2010/0098312 | A1* | 4/2010 | Leahy | G06T 11/005 |
| | | | | 382/131 |
| 2012/0070050 | A1* | 3/2012 | Panin | G06T 11/005 |
| | | | | 382/131 |
| 2012/0070057 | A1* | 3/2012 | Zhang | G06T 11/005 |
| | | | | 382/131 |
| 2013/0028496 | A1* | 1/2013 | Panin | G06T 11/003 |
| | | | | 382/131 |
| 2014/0254760 | A1* | 9/2014 | Hiroike | A61B 6/4233 |
| | | | | 378/62 |
| 2015/0036789 | A1* | 2/2015 | Panin | G06T 11/006 |
| | | | | 378/4 |
| 2015/0065854 | A1* | 3/2015 | Ahn | A61B 6/5247 |
| | | | | 600/411 |
| 2019/0346577 | A1* | 11/2019 | Bai | A61B 6/037 |
| 2020/0151918 | A1* | 5/2020 | Watson | A61B 6/4291 |
| 2021/0378611 | A1* | 12/2021 | De Man | A61B 6/4078 |
| 2022/0022834 | A1* | 1/2022 | Nehmeh | G01T 1/2985 |
| 2022/0091286 | A1* | 3/2022 | Panin | A61B 6/4417 |
| 2022/0111868 | A1* | 4/2022 | Costea | G06V 20/56 |

OTHER PUBLICATIONS

Iatrou et al. "Comparison of two 3D implementations of TOF Scatter Estimation in 3D PET," IEEE Nuclear Science Symposium Conference Record, 2007, pp. 3474-3477.

Watson, Charles, "Extension of Single Scatter Simulation to Scatter Correction of Time-of-Flight PET," IEEE Transactions on Nuclear Science, vol. 54, No. 5, Oct. 2007, pp. 1679-1686.

Jin et al. "List-mode reconstruction for the Biograph mCT with physics modeling and event-by-event motion correction," Phys. Med. Biol. 58, 2013, pp. 5567-5591.

Written Opinion for PCT application PCT/JP2017/009531 dated May 16, 2017.

International Search Report for PCT application PCT/JP2017/009531 dated May 16, 2017.

* cited by examiner

|   | TOF₀ | TOF₁ | TOF₂ | TOF₃ | TOF₄ | TOF₅ | TOF₆ | TOF₇ | TOF₈ |   |
|---|---|---|---|---|---|---|---|---|---|---|
| P | 0 | 1 | 3 | 8 | 4 | 2 | 1 | 1 | 0 | Total: 20 |

|   | TOF₀ | TOF₁ | TOF₂ | TOF₃ | TOF₄ | TOF₅ | TOF₆ | TOF₇ | TOF₈ |   |
|---|---|---|---|---|---|---|---|---|---|---|
|   | $\frac{0}{20}$ | $\frac{1}{20}$ | $\frac{3}{20}$ | $\frac{8}{20}$ | $\frac{4}{20}$ | $\frac{2}{20}$ | $\frac{1}{20}$ | $\frac{1}{20}$ | $\frac{0}{20}$ | × $S_{NT}$ |

|   | TOF₀ | TOF₁ | TOF₂ | TOF₃ | TOF₄ | TOF₅ | TOF₆ | TOF₇ | TOF₈ |
|---|---|---|---|---|---|---|---|---|---|
| $S_{TOF}$ | $\frac{0}{20}$ | $\frac{S_{NT}}{20}$ | $\frac{3S_{NT}}{20}$ | $\frac{8S_{NT}}{20}$ | $\frac{4S_{NT}}{20}$ | $\frac{2S_{NT}}{20}$ | $\frac{S_{NT}}{20}$ | $\frac{S_{NT}}{20}$ | $\frac{0}{20}$ |

FIG. 6

SCATTER ESTIMATION METHOD, SCATTER ESTIMATION PROGRAM, AND POSITRON CT DEVICE HAVING SAME INSTALLED THEREON

TECHNICAL FIELD

The present invention relates to a scatter estimation method, and a scatter estimation program. It also relates to a data correction technology of a TOF (Time Of Flight)-PET (Positron Emission Tomography) for measuring a detection time difference of two annihilation photons that have reached detectors in a positron CT apparatus having the scatter estimation program installed thereon.

BACKGROUND ART

A positron CT apparatus, i.e., a PET apparatus, is configured to measure two γ-rays generated by positron annihilation are regarded as valid signals only when they are simultaneously detected by a plurality of detectors (that is, only when they are coincidentally counted), and the tomographic image of the subject is reconstructed based on the measurement data. Specifically, a radioactive pharmaceutical containing positron emitting nuclides is administered to a subject, the 511 keV annihilation γ-rays emitted from the administered subject are detected by detectors composed of a group of a number of detector elements (e.g., scintillators). And, when γ-rays are detected within a fixed time period with two detectors, it is regarded as being detected "coincidentally", they are counted as a pair of annihilation γ-rays, and furthermore, a straight line referred to as LOR (Line Of Response) connecting two detectors that detected the annihilation γ-rays is specified. The coincidence counting information detected as described above is accumulated and subjected to reconstruction processing to obtain a positron emitting nuclide image (i.e., a tomographic image).

In a positron CT (PET), in order to perform a quantitative measurement of a radioactivity concentration in a subject, various data correction processing are required. Representative correction processing includes sensitivity correction, attenuation correction, scatter correction, random correction, decay correction, and dead time correction. The present invention relates to scatter correction of a PET that measuring information of the detection time difference (also referred to as TOF difference) of annihilation radiations (hereinafter referred to as "TOF-PET"). In order to perform the scatter correction, it is necessary to perform scatter estimation to estimate the distribution of the scattered radiations.

The scatter estimation is to estimate distribution of scattered radiations included in PET measurement data. The scatter correction is to subtract the distribution of estimated scattered radiations from the measurement data and convert it into data from which the influence of the scattered radiations (i.e., bias) has been eliminated, or to incorporate the distribution of the estimated scattered radiations into the image reconstruction formula to obtain a reconstructed image from which the influence of the scattered radiations has been eliminated.

Here, the data format of the PET measurement data is any one of a sinogram, a histogram, and a list mode. The sinogram data is signal value array data allocated to each element in the projection angle direction and each element in the radial direction. The histogram data is signal value array data allocated to each pair of coincident-counted detectors. The list mode data is time-series data allocated to each event that corresponds to detected γ-rays.

When the data format is a sinogram or a histogram, the measurement data of the PET which does not measure TOF information (hereinafter referred to as "non-TOF-PET") is four-dimensional array data. On the other hand, the measurement data of the TOF-PET is five-dimensional array data to which a temporal division of TOF information is added. When the data format is a sinogram or a histogram, the scatter estimation in TOF-PET is to estimate the absolute amount of scattered radiations included in each element of this five-dimensional array data.

In cases where a detector ring surrounding a subject is stacked along the body axis direction of the subject, when the data format is a sinogram, the measurement data of the TOF-PET becomes five-dimensional array data of $P[t][r_0][r_1][\theta][s]$, and the measurement data of the non-TOF-PET is four-dimensional array data of $P[r_0][r_1][\theta][s]$. Here, "t" denotes an element of time division of the TOF information, "$r_0$" and "$r_1$" denote detector ring numbers, "θ" denotes an element in the projection angle direction, and "s" denotes an element in the radial direction. It should be noted that in cases where the number of the detector ring is one, the elements of $[r_0][r_1]$ are omitted.

As a scatter estimation method for the measurement data of TOF-PET, various methods have been proposed (see, for example, Patent Documents 1 to 5 and Non-Patent Documents 1 to 3).

For example, in Patent Document 1: U.S. Pat. No. 7,129,496, by estimating the distribution of virtual scattered radiations in the absence of measurement errors of TOF information and convolving the function representing the measurement error of the TOF information (timing response function) in the time division of the TOF information of the estimated scattered radiations distribution, the distribution of actual scattered radiations is estimated (see the scatter estimation formula in column 5, line 60 of Patent Document 1). This is the method described in Non-Patent Document 1.

Further, in Patent Document 2: U.S. Pat. No. 7,397,035, a single scatter simulation (SSS: Single Scatter Simulation) algorithm (see formula (1) of Patent Document 2) for estimating the distribution of the scattered radiations in non-TOF-PET is extended so that the distribution of the scattered radiations of TOF-PET can be estimated. Specifically, when calculating the line integral value of the radiation distribution $\lambda(\bullet)$ on the straight line connecting the scattering point S and the detection point A (B) (see FIG. 3 of Patent Document 2) using the Formula (2) of Patent Document 2, the detection efficiency function $\varepsilon_{TOF,n}(\bullet)$ (see Equation (3) of Patent Document 2) of each TOF offset bin is considered. This method is later published by Non-Patent Document 2. Here, the "bin" means discretization (dividing). In the case of an image, pixels correspond to bins. The TOF bin means time division of TOF information, and for example, when the TOF bin is 100 [ps], it is temporally divided every 100 [ps], such as, e.g., 100 [ps], 200 [ps], 300 [ps], . . . .

Further, in Patent Document 4: U.S. Pat. No. 8,265,365, instead of directly calculating the distribution of the scattered radiations of TOF-PET based on the mathematical formula as described in Patent Document 2: U.S. Pat. No. 7,397,035, a bias-free reconstructed image is pre-calculated from non-TOF projection data. Then, by subtracting the TOF forward projection data of the image ("TOF trues distribution" recited in Claim 1 of Patent Document 4) from the prompt coincidence data mixed with scattered radiations ("TOF prompt coincidence events" recited in Claim 1 of Patent Document 4), the distribution of scattered radiations is estimated indirectly.

Further, in Patent Document 5: International Patent Publication No. WO 2013/175352, instead of estimating the distribution of the scattered radiations based on the analytical calculation as described in Patent Document 2: U.S. Pat. No. 7,397,035 and Patent Document 4: U.S. Pat. No. 8,265,365, the distribution of the scattered radiations is estimated based on the Monte Carlo simulation.

Further, in Non-Patent Document 3, TOF projection data including scatter components is generated, and the ratio of the signal value in the non-TOF projection data obtained by integrating (that is, adding) the TOF projection data in the time division (also referred to as "TOF direction") of TOF information to the signal value in each TOF projection data is calculated as a distribution ratio in which the data is distributed every time division (TOF direction) of the TOF information.

On the other hand, in Non-Patent Document 3, the distribution of the non-TOF scattered radiation (non-TOF scatter projection data) is obtained by a known technique, such as, e.g., a non-TOF-SSS algorithm, an energy window method, and a convolution method, and the non-TOF scatter projection data is distributed over a plurality of time divisions based on the aforementioned distribution ratio to calculate each distributed data as TOF scatter projection data (distribution of TOF scattered radiations) which is scatter projection data for each time division of the TOF information.

The method of Non-Patent Document 3 will be described in detail. The projection data obtained by integrating unknown TOF scatter projection data (five-dimensional array data) in which the data format is a sinogram in the time division (TOF direction) of TOF information becomes non-TOF scatter projection data (four-dimensional array data).

Therefore, in each element (corresponding to each pair of detectors) of the four-dimensional array data, when the profile showing how the scattered radiation amount changes in the time division (TOF direction) of the TOF information (hereinafter also referred to as "TOF direction profile") is known, it is easy to expand the non-TOF scatter projection data in the TOF direction according to the profile (distribute to the same number as the number of TOF bins). As a result, each data expanded in the TOF direction can be estimated as TOF scatter projection data. That is, when the non-TOF scatter projection data (distribution of the non-TOF scattered radiations) is known, performing estimation of the TOF scatter projection data is essentially equal to "determining the TOF direction profile".

This will be specifically described with reference to the conceptual diagram of FIG. 6 in Non-Patent Document 3. The signal value array data in TOF projection data including scatter components is referred to as P as shown in the upper row of FIG. 6. It is assumed that when the number of TOF bins is nine and TOF bines are arranged in the TOF direction, each signal value array data P in the TOF projection data is {0, 1, 3, 8, 4, 2, 1, 1, 0}. When the TOF projection data P is integrated in time division (TOF direction) of the TOF information, the signal value in the non-TOF projection data becomes "20" (see "total: 20" in the upper row of FIG. 6).

Figure 6:
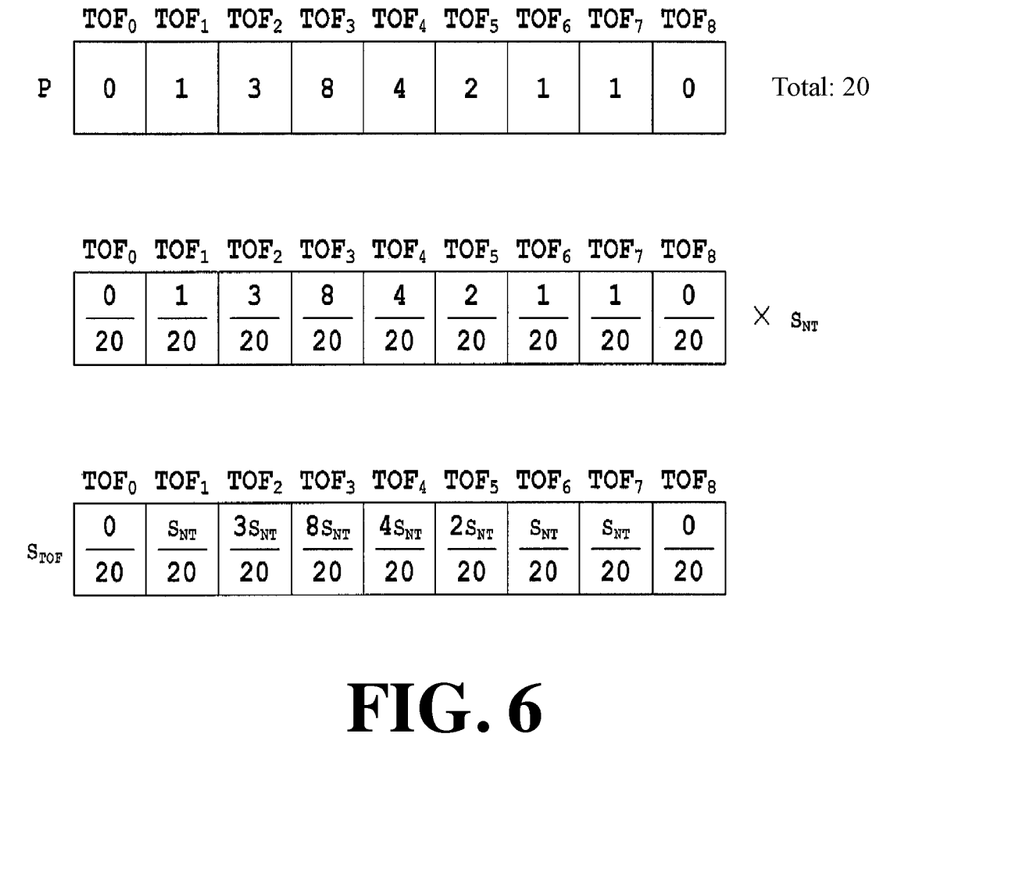
FIG. 6 is a conceptual diagram in Non-Patent Document 3.

As shown in the middle row of FIG. 6, when each signal value array data P {0, 1, 3, 8, 4, 2, 1, 1, 0} in the TOF projection data shown in the upper row of FIG. 6 is a numerator and that the signal value "20" in the non-TOF projection data is a denominator, the TOF direction profile becomes {0/20, 1/20, 3/20, 8/20, 4/20, 2/20, 1/20, 1/20, 0/20}. This TOF direction profile can be regarded as a distribution ratio that distributes data for each time division (TOF direction) of the TOF information.

On the other hand, as described above, non-TOF scatter projection data can be obtained by a known technique, such as, e.g., a non-TOF-SSS algorithm, an energy window method, and a convolution method. The signal value in the non-TOF scatter projection data is defined as $S_{NT}$ as shown in the middle row of FIG. 6. Therefore, if the signal value $S_{NT}$ in the non-TOF scatter projection data is distributed to the same number as the number of TOF bins (nine in FIG. 6) according to the distribution ratio corresponding to the TOF direction profile, the distributed individual data can be obtained as TOF scatter projection data which is scatter projection data for each time division (TOF direction) of the TOF information. The simplest distribution method is to multiply the signal value $S_{NT}$ in the non-TOF scatter projection data and the distribution ratio and obtain each data as TOF scatter projection data (see Formula (3) of Non-Patent Document 3).

The lower row of FIG. 6 shows signal value array data in the TOF scatter projection data obtained by multiplying the signal value $S_{NT}$ in the non-TOF scatter projection data and the distribution ratio. The signal value array data in the TOF scatter projection data is defined as $S_{TOF}$ as shown in the lower row of FIG. 6. The signal value array data $S_{TOF}$ in the TOF scatter projection data becomes {0/20 $S_{NT}$, 1/20 $S_{NT}$, 3/20 $S_{NT}$, 8/20 $S_{NT}$, 4/20 $S_{NT}$, 2/20 $S_{NT}$, 1/20 $S_{NT}$, 1/20 $S_{NT}$, 0/20 $S_{NT}$}). Thus, when non-TOF scatter projection data is known, the ratio of the signal value in the non-TOF projection data obtained by integrating the TOF projection data in the time division (TOF direction) of the TOF information to the signal value in each TOF projection data can be calculated as the distribution ratio corresponding to the TOF direction profile. Furthermore, by distributing the non-TOF scatter projection data to a plurality of time divisions in accordance with the distribution ratio, the scatter estimation can be easily performed.

PRIOR ART DOCUMENT

Patent Document

Patent Document 1: U.S. Pat. No. 7,129,496
Patent Document 2: U.S. Pat. No. 7,397,035
Patent Document 3: U.S. Pat. No. 8,809,791
Patent Document 4: U.S. Pat. No. 8,265,365
Patent Document 5: International Patent Publication No. WO 2013/175352

Non-Patent Document

Non-Patent Document 1: M. Iatrou et al., "Comparison of two 3D implementations of TOF scatter estimation in 3D PET", Nuclear Science Symposium Conference Record, 2007. NSS '07. IEEE (Volume: 5), 3474-3477.
Non-Patent Document 2: C. Watson, "Extension of Single Scatter Simulation to Scatter Correction of Time-of-Flight PET", IEEE Transactions on Nuclear Science (Volume: 54, Issue: 5), pp. 1679-1686, 2007.
Non-Patent Document 3: X. Jin et al., "List-mode reconstruction for the Biograph mCT with physics modeling and event-by-event motion correction", Phys. Med. Biol. 58 (2013) 5567-5591

SUMMARY OF THE INVENTION

Problems to be Solved by the Invention

However, in the scatter estimation method in Non-Patent Document 3, there is a problem that the TOF direction profile of the scattered radiations cannot be determined accurately.

First, TOF projection data $y_p$ (five-dimensional array data) of the prompt coincidence actually measured in a standard energy window (for example, 400 keV to 600 keV) for the purpose of measuring data used for image reconstruction is generated. The TOF projection data $y_r$ of the random coincidence actually measured (or calculated) in the aforementioned energy window is generated. Subtracting $y_r$ from $y_p$ yields TOF projection data $y_{t+s}$ containing only true coincidence and scatter coincidence. A count value profile in the TOF direction of $y_{t+s}$ that is five-dimensional array data is calculated, and set as a TOF direction profile.

In this method, since the TOF direction profile is estimated from the TOF projection data $y_{t+s}$ of the sum of the true coincidence and the scatter coincidence included in a standard energy window (e.g., 400 keV to 600 keV), the TOF direction profile of the scattered radiations cannot be determined strictly.

The present invention has been made in view of such circumstances, and aims to provide a scatter estimation method and a scatter estimation program capable of performing accurate scatter estimation, and a positron CT apparatus having the scatter estimation program installed thereon.

Means for Solving the Problems

As a result of intensive research to solve the above problems, the inventor has estimated as follows.

That is, as described above, since the TOF direction profile is estimated from the TOF projection data $y_{t+s}$ including true coincidence and scatter coincidence, it is not possible to accurately obtain the TOF direction profile of scattered radiations. On the other hand, the projection data measured in an energy window (for example, 450 keV or less) having center energy lower than that in a standard energy window includes some true coincidence. However, compared with the projection data measured in a standard energy window in Non-Patent Document 3, the proportion of scatter coincidence increases as the proportion of the true coincidence included in the projection data decreases.

Therefore, an energy window of 450 keV or less is regarded as a scattered radiation energy window, and the inventor estimated that the scatter estimation can be performed accurately by estimating the TOF direction profile of the scattered radiations from the data measured in a scattered radiation energy window (hereinafter also referred to as "low energy window") and further obtaining the distribution ratio.

The present invention based on such estimation has the following configuration.

That is, a scatter estimation method according to the present invention is a scatter estimation method for measurement data of a positron CT. The scatter estimation method includes:

a first TOF projection data generation step of generating first TOF projection data which is projection data for each time division by allocating detection signal data measured in a reconstruction data energy window set to obtain reconstruction data obtained by the positron CT to each time division of TOF information which is a detection time difference of two annihilation radiations that have reached detectors;

a second TOF projection data generation step of generating second TOF projection data which is projection data for each time division by allocating detection signal data measured in a scattered radiation energy window having center energy lower than center energy in the reconstruction data energy window for each time division;

a distribution ratio calculation step of calculating a ratio of a signal value in non-TOF projection data obtained by integrating the second TOF projection data in the time division to a signal value in each of the second TOF projection data as a distribution ratio that distributes data for each time division;

a non-TOF scatter projection data generation step of generating non-TOF scatter projection data included in the reconstruction data energy window by performing scatter estimation processing on non-TOF projection data obtained by integrating the first TOF projection data in the time division; and a TOF scatter projection data calculation step of calculating projection data composed of a signal value obtained by multiplying a signal value in the non-TOF scatter projection data and the distribution ratio as TOF scatter projection data which is scatter projection data for each time division included in the reconstruction data energy window.

According to the scatter estimation method of the present invention, the reconstruction data energy window is a standard energy window, and in the first TOF projection data generation step, first TOF projection data which is projection data for each time division is generated by allocating detection signal data measured in a reconstruction data energy window (standard energy window) for each time division of TOF information, which is the detection time difference of two annihilation radiations that have reached detectors.

On the other hand, the scattered radiation energy window having center energy lower than that in a standard energy window is a low energy window, and in the second TOF projection data generation step, second TOF projection data, which is projection data for each time division, is generated by allocating detection signal data measured in the scattered radiation energy window (low energy window) for each time division of TOF information. As described above, the second TOF projection data measured in the low energy window contains a large proportion of scatter coincidence, but includes some true coincidence and does not match the TOF scatter projection data in a standard energy window. Therefore, the second TOF projection data is not TOF scatter projection data in a standard energy window to be finally obtained.

Therefore, TOF scatter projection data in a standard energy window is obtained by performing the following steps. In the distribution ratio calculation step, a ratio of a signal value in the non-TOF projection data obtained by integrating the second TOF projection data in the time division to a signal value in each of the second TOF projection data is calculated as a distribution ratio that distributes data for each time division.

On the other hand, in the non-TOF scatter projection data generation step, non-TOF scatter projection data included in a standard energy window is generated by performing scatter estimation processing on non-TOF projection data obtained by integrating the first TOF projection data in the time division. And, in the TOF scatter projection data calculation processing, projection data composed of a signal value obtained by multiplying the signal value in the non- TOF scatter projection data and the distribution ratio is calculated as TOF scatter projection data which is scatter projection data for each time division included in a standard energy window.

As described above, when the distribution ratio is obtained from data measured in a low energy window (second TOF projection data), scatter estimation can be performed accurately. Further, since the target of distribution is non-TOF scatter projection data in a standard energy window, post-distribution TOF scatter projection data can be obtained as approximate TOF scatter projection data in a standard energy window, which leads to accurate scatter estimation.

In addition, random coincidence is included in the first TOF projection data and the second TOF projection data collected directly from the coincidence counting circuit. Therefore, in order to remove random coincidence, in the first TOF projection data generation step, it is preferable to create the TOF projection data by subtracting TOF projection data of random coincidence from TOF projection data of prompt coincidence as first TOF projection data. In the same manner, in order to remove random coincidence, in the second TOF projection data generation step, it is preferable to create the TOF projection data by subtracting TOF projection data of random coincidence from TOF projection data of prompt coincidence as second TOF projection data. In both steps of the first TOF projection data generation step and the second TOF projection data generation step described above, it is more preferable to respectively subtract TOF projection data of random coincidence from TOF projection data of prompt coincidence.

In addition, as the scatter estimation processing in the aforementioned non-TOF scatter projection data generation step, for example, there is scatter estimation processing in the following method.

An example of the scatter estimation processing in the non-TOF scatter projection data generation step is scatter estimation processing in an energy window method of estimating the scattered radiation distribution using a reconstruction data energy window (standard energy window) and a scattered radiation energy window (low energy window). Further, the other example of the scatter estimation processing in the non-TOF scatter projection data generation step is scatter estimation processing in a single scatter simulation method for estimating scattered radiation distribution using a radioactivity distribution image and an attenuation coefficient image as input data.

Further, the scatter estimation program according to the present invention is a program for executing the scatter estimation method according to the present invention by a computer.

According to the scatter estimation program according to the present invention, by executing the scatter estimation method according to the present invention by a computer, the distribution ratio is obtained from the second TOF projection data measured in the scattered radiation energy window (low energy window), and the target of distribution is non-TOF scatter projection data in a reconstruction data energy window (standard energy window). Therefore, the post-distribution TOF scatter projection data can be obtained as approximate TOF scatter projection data in the reconstruction data energy window (standard energy window), which leads to accurate scatter estimation.

Further, the positron CT apparatus according to the present invention is provided with a computing means configured to execute the scatter estimation program in a positron CT apparatus in which the scatter estimation program according to the present invention is installed.

According to the positron CT apparatus of the present invention, by providing a computing means configured to execute the scatter estimation program according to the present invention, the distribution ratio is obtained from the second TOF projection data measured in the scattered radiation energy window (low energy window), and the target of distribution is the non-TOF scatter projection data in the reconstruction data energy window (standard energy window). Therefore, the post-distribution TOF scatter projection data can be obtained as approximate TOF scatter projection data in a reconstruction data energy window (standard energy window), which leads to accurate scatter estimation.

Effects of the Invention

According to the scatter estimation method, the scatter estimation program, and the positron CT apparatus having the scatter estimation program installed thereon, the distribution ratio is obtained from the second TOF projection data measured in the scattered radiation energy window (low energy window), and the target of distribution is non-TOF scatter projection data in the reconstruction data energy window (standard energy window). Therefore, the post-distribution TOF scatter projection data can be obtained as approximate TOF scatter projection data in a reconstruction data energy window (standard energy window), which leads to accurate scatter estimation.

EMBODIMENT 1

Figure 1:
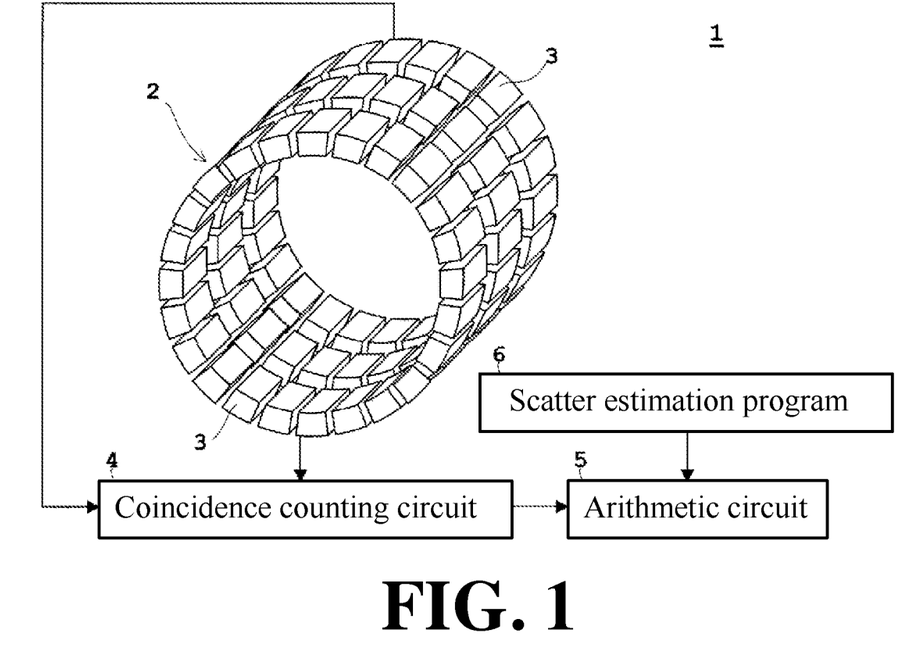
FIG. 1 is a schematic perspective view and a block diagram of a PET apparatus according to each Embodiment.
Figure 2:
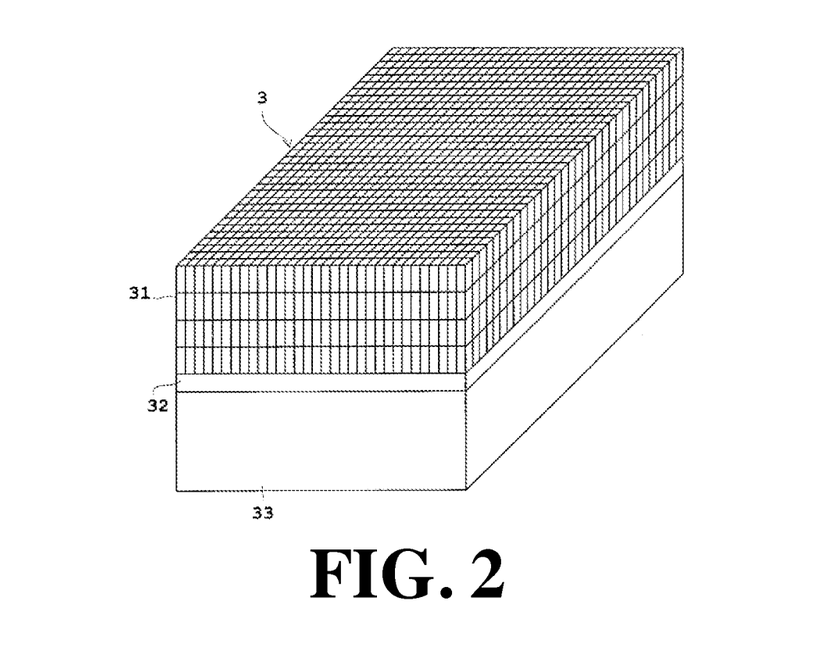
FIG. 2 is a schematic perspective view of a γ-ray detector.

Hereinafter, Embodiment 1 of the present invention will be described with reference to the drawings. FIG. 1 is a schematic perspective view and a block diagram of a PET apparatus according to each Embodiment, and FIG. 2 is a schematic perspective view of a γ-ray detector. Further, FIG. 1 and FIG. 2 show a configuration common to the respective Embodiments.

As shown in FIG. 1, the PET apparatus 1 is provided with a detector ring 2 configured to surround a subject and stacked along the body axis direction of the subject. A plurality of γ-ray detectors 3 is embedded in the detector ring 2. The PET apparatus 1 corresponds to the positron CT apparatus in the present invention. Also, the γ-ray detector 3 corresponds to the detector in the present invention.

Other than the above, the PET apparatus 1 is provided with a coincidence counting circuit 4 and an arithmetic circuit 5. Although only two connections from γ-ray detectors 3 to the coincidence counting circuit 4 are shown in FIG. 1, it should be noted that connections corresponding to the total number of channels of the photomultiplier tubes (PMT: Photo Multiplier Tube) 33 (see FIG. 2) of the γ-ray detectors 3 are connected to the coincidence counting circuit 4. The arithmetic circuit 5 executes the processing of the scatter estimation method shown in FIG. 3 which will be described later according to the scatter estimation program 6. The arithmetic circuit 5 corresponds to the computing means in the present invention.

The scintillator block 31 (see FIG. 2) of the γ-ray detector 3 converts the v-ray generated from a subject (not illustrated) to which radioactive pharmaceutical has been administered into light, and the converted light is multiplied by the photomultiplier tube (PMT) 33 (see FIG. 2) of the γ-ray detector 3 and converted into an electric signal. The electric signal is sent to the coincidence counting circuit 4 to generate detection signal data of the count value.

Specifically, when radioactive pharmaceutical is administered to a subject (not illustrated), two γ-rays are generated due to the disappearance of the positron emission type RI positron. The coincidence counting circuit 4 checks the position of the scintillator block 31 (see FIG. 2) and the incident timing of the γ-ray, and determines the sent electric signal as appropriate data only when the γ-rays are simultaneously incident on two scintillator blocks 31 on both sides of the subject. When a γ-ray is incident on only one scintillator block 31, the coincidence counting circuit 4 rejects. That is, the coincidence counting circuit 4 detects that γ-rays are simultaneously observed (that is, coincidence-counted) in two γ-ray detectors 3 based on the electric signal described above.

The detection signal data (count value) composed of appropriate data determined to be coincidence counting by the coincidence counting circuit 4 is sent to the arithmetic circuit 5. The arithmetic circuit 5 performs Steps S1 to S5 (see FIG. 3) which will be described later and performs the scatter estimation from the detection signal data (count value) of the subject (not illustrated) obtained by the PET apparatus 1. The specific functions of the arithmetic circuit 5 will be described later.

Note that the scatter estimation program 6 is stored in a storage medium (not illustrated) represented by a ROM (Read-only Memory), etc. The scatter estimation program 6 is read from the storage medium to the arithmetic circuit 5, and the scatter estimation program 6 is executed by the arithmetic circuit 5, thereby performing the processing of the scatter estimation method shown in the flowchart of FIG. 3. The arithmetic circuit 5 is configured by a programmable device (for example, an FPGA (Field Programmable Gate Array) in which the internal hardware circuit (for example, a logic circuit) can be changed according to a GPU (Graphics Processing Unit), a central processing unit (CPU), program data, and so on.

As shown in FIG. 2, the γ-ray detector 3 is provided with a scintillator block 31, a light guide 32 optically coupled to the scintillator block 31, and a photomultiplier tube (simply abbreviated as "PMT") optically coupled to the light guide 33. Each scintillator element constituting the scintillator block 31 converts a γ-ray into light by emitting light upon incidence of the γ-ray. By this conversion, the scintillator element detects a γ-ray. The light emitted in the scintillator element is sufficiently diffused in the scintillator block 31 and input to the PMT 33 through the light guide 32. The PMT 33 multiplies the light converted by the scintillator block 31 and converts it into an electric signal. The electric signal is sent to the coincidence counting circuit 4 (see FIG. 1) as a pixel value.

Further, as shown in FIG. 2, the γ-ray detector 3 is a DOI detector which is composed of scintillator elements arranged three-dimensionally and is composed of a plurality of layers arranged in the depth direction. Although FIG. 2 illustrates a four-layer DOI detector, the number of layers is not particularly limited as long as it is plural.

Here, the DOI detector is configured by laminating scintillator elements in the depth direction of radiation, and obtains the coordinate information in the depth direction (DOI: Depth of Interaction) and the lateral direction (direction in parallel to the incident surface) that caused the interaction by gravity center calculations. The spatial resolution in the depth direction can be further improved by using the DOI detector. Therefore, the number of layers of the DOI detector is the number of layers of scintillator elements stacked along the depth direction.

Figure 3:
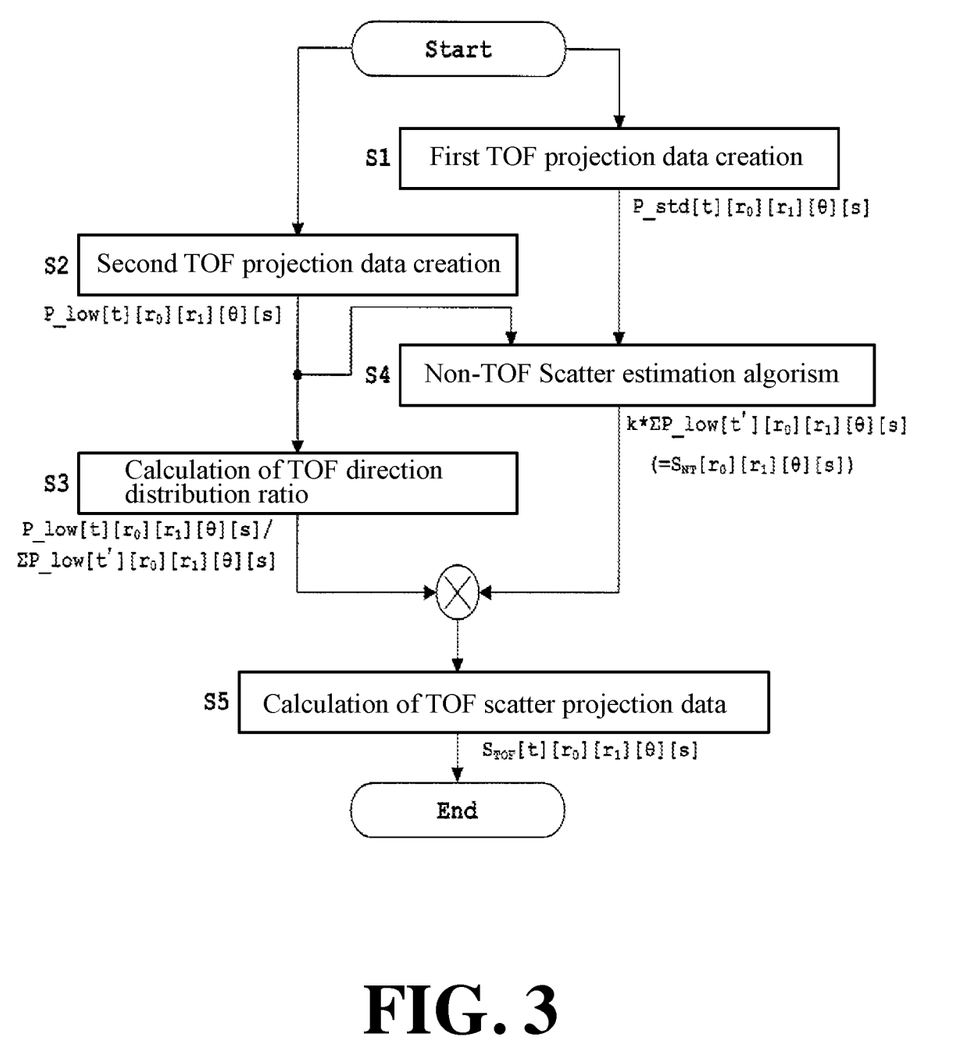
FIG. 3 is a flowchart showing the processing procedure and the flow of data of the scatter estimation method according to Embodiment 1.

Next, specific functions of the arithmetic circuit 5 will be described with reference to FIG. 3. FIG. 3 is a flowchart showing the processing procedure and the flow of data of the scatter estimation method according to Embodiment 1.

First, a subject is scanned by the PET apparatus 1 shown in FIG. 1, and list mode data is acquired by the coincidence counting circuit 4 (see FIG. 1). In the list mode data, the energy information of the detected photon is recorded.

(Step S1) Generation of First TOF Projection Data

A standard energy window (e.g., 400 keV to 600 keV), that is, a reconstruction data energy window, and the measurement range and the bin width of the TOF projection data in the TOF direction are set. According to the setting, first TOF projection data corrected for random coincidence is generated from the list mode data. Specifically, the data coincidentally counted is measured in a state in which one of the pair of detectors for coincidence counting is delayed by a delay circuit (not illustrated) as TOF projection data of random coincidence, and the TOF projection data of the random coincidence is subtracted from the TOF projection data of prompt coincidence. Thus, first TOF projection data from which random coincidence has been removed is generated.

This first TOF projection data is data set in a standard energy window. When the data format is a sinogram, signal value array data in the first TOF projection data is defined as P_std[t][$r_0$][$r_1$][θ][s]. As described in the "Background Art" section, "t" denotes an element of time division of the TOF information, "$r_0$" and "$r_1$" denote detector ring numbers, "θ" denotes an element of the projection angle direction, and "s" denotes an element of the radial direction. Step S1 corresponds to the first TOF projection data generation step in the present invention.

(Step S2) Generation of Second TOF Projection Data

On the other hand, a low energy window (e.g., 450 keV or less), that is, a scattered radiation energy window, and the measurement range and the bin width of the TOF projection data in the TOF direction are set. According to the setting, second TOF projection data corrected for random coincidence is generated from the list mode data. The specific method of removing the random coincidence is the same as that of Step S1, and thus the description thereof is omitted.

This second TOF projection data is data set in a low energy window. When the data format is a sinogram, signal value array data in the second TOF projection data is defined as P_low[t][$r_0$][$r_1$][θ][s]. Step S2 corresponds to the second TOF projection data generation step in the present invention.

(Step S3) Calculation of TOF Direction Distribution Ratio

The signal value array data P_low[t][r₀][r₁][θ][s] in the second TOF projection data generated in Step S2 is integrated in the time division of the TOF information to acquire the signal value array ΣP_low[t'][r₀][r₁][θ][s] (where Σ is a sum of P_low[t'][r₀][r₁][θ][s] in the measurement range of the element t' in the TOF direction) in non-TOF projection data. The ratio of the signal value array data ΣP_low[t'][r₀][r₁][θ][s] in this non-TOF projection data to the signal value array data P_low[t][r₀][r₁][θ][s] in each second TOF projection data, that is, P_low[t][r₀][r₁][θ][s]/ΣP_low[t'][r₀][r₁][θ][s], is calculated as a distribution ratio (distribution ratio in the TOF direction) which distributes data for each time division of the TOF information. Step S3 corresponds to the distribution ratio calculation step in the present invention.

(Step S4) Non-TOF Scatter Estimation Algorithm

Scatter estimation processing (herein after referred to as "non-TOF scatter estimation algorithm") is performed on non-TOF projection data obtained by integrating the first TOF projection data generated in Step S1 in the time division of the TOF information. The non-TOF scatter estimation algorithm will be described in Embodiment 1 by taking scatter estimation processing in an energy window method as an example.

The energy window method is a known method for estimating a scattered radiation distribution using a reconstruction data energy window (standard energy window) and a scattered radiation energy window (low energy window). However, in Embodiment 1, an energy window method will be conceptually described.

In the energy window method, projection data (sinogram) P_std is generated in a standard energy window, and projection data (sinogram) P_low is generated in a low energy window. By subtracting a scaled P_low from P_std, the true coincidence counting sinogram T is obtained. That is, by the formula of T=P_std−k×P_low, the true coincidence counting sinogram T is obtained. Here, "k" is a coefficient obtained in advance.

Therefore, a value (k×ΣP_low[t'][r₀][r₁][θ][s]) obtained by integrating the signal value array data P_low[t][r₀][r₁][θ][s] in the second TOF projection data generated in Step S2 in the time division of the TOF information, and the signal value array data ΣP_low[t'][r₀][r₁][θ][s] in the obtained non-TOP projection data multiplied by a constant becomes the signal value array data in the estimated scatter sinogram. Here, the estimated scatter sinogram corresponds to the non-TOF scatter projection data included in the standard energy window, assuming that the signal value array data in this non-TOF scatter projection data is $S_{NT}$[r₀][r₁][θ][s], it is represented by $S_{NT}$[r₀][r₁][θ][s]=k×ΣP_low[t'][r₀][r₁][θ][s].

In advance, by scanning a radiation source, alternatively, scanning a phantom (for example, a phantom of the same size as the subject) as an imaging target, and adjusting k so that the true coincidence counting sinogram T obtained from the projection data P_std in the obtained standard energy window and the projection data P_low in the low energy window does not include scattered radiations, the adjusted k is used as a pre-determined coefficient. For a specific method of the energy window method, please refer to the reference (Reference: S Grootoonk et al., "Correction for scatter in scatter 3D brain PET using a dual energy window method", Phys. Med. Biol. 41 (1996) 2757-2774.) Step S4 corresponds to the non-TOF scatter projection data generation step in the present invention.

(Step S5) Calculation of TOF Scatter Projection Data

Signal value array data ($S_{NT}$[r₀][r₁][θ][s]=k×ΣP_low[t'][r₀][r₁][θ][s]) in non-TOF scatter projection data (estimated scatter sinogram) included in the standard energy window generated in Step S4 and the distribution ratio P_low[t][r₀][r₁][θ][s]/ΣP_low[t'][r₀][r₁][θ][s] obtained in Step S3 are multiplied. The multiplication formula is expressed by the following formula (1).

$$S_{TOF}[t][r_0][r_1][\theta][s] = \frac{\text{P\_low}[t][r_0][r_1][\theta][s]}{\sum_{t'} \text{P\_low}[t'][r_0][r_1][\theta][s]} S_{NT}[r_0][r_1][\theta][s] \quad (1)$$

Here, $S_{TOF}$[t][r₀][r₁][θ][s] is signal value array data in TOF scatter projection data. By performing multiplication like the aforementioned formula (1), TOF scatter projection data included in the standard energy window is finally obtained. It should be noted that since ΣP_low[t'][r₀][r₁][θ][s] is multiplied by k in the energy window method in Step S4, even if P_low[t][r₀][r₁][θ][s]/ΣP_low[t'][r₀][r₁][θ][s] is multiplied in Step S5, the signal value array data in TOF scatter projection data which is finally obtained by multiplication does not return to the original P_low[t'][r₀][r₁][θ][s]. Step S5 corresponds to the TOF scatter projection data calculation step in the present invention.

The TOF scatter projection data obtained in Step S5 becomes the distribution of the scattered radiations for performing the scatter correction. As described in the "Background Art" section, the scatter correction is performed by subtracting the distribution of the estimated scattered radiations from the measurement data to convert it into data from which the influence of the scattered radiations (bias) has been eliminated, or by incorporating the distribution of the estimated scattered radiations into the image reconstruction formula to obtain a reconstructed image from which the influence of the scattered radiations has been eliminated.

Note that the order of Steps S1 and S4 and Steps S2 and S3 is not particularly limited. Steps S1 and S4 may be performed after Steps S2 and S3, or Steps S1 and S4 may be performed in parallel with Steps S2 and S3. However, in the case of Embodiment 1, in Step S4, since the second TOF projection data in the scattered radiation energy window (low energy window) generated in Step S2 is used, Step S4 is performed after Step S2.

According to the scatter estimation method of Embodiment 1, the reconstruction data energy window is a standard energy window, in Step S1 (creation of the first TOF projection data), the first TOF projection data (signal value array data P_std[t][r₀][r₁][θ][s]) which is projection data for each time division is generated by allocating detection signal data measured in a reconstruction data energy window (standard energy window) for each time division of TOF information, which is the detection time difference of two annihilation radiations that have reached detectors.

On the other hand, the scattered radiation energy window having center energy lower than center energy in the standard energy window is a low energy window, in Step S2 (creation of the second TOF projection data), by allocating the detection signal data measured in the scattered radiation energy window (low energy window) for each time division of the TOF information, the second TOF projection data (signal value array data P_low[t][r₀][r₁][θ][s]), which is projection data for each time division, is generated. As described in the "Means for Solving the Problems" section, the second TOF projection data actually measured in the low energy window contains a large proportion of scatter coincidence, but includes some true coincidence counting and does not match the TOF scatter projection data in the standard energy window. Therefore, the second TOF projection data is not TOF scatter projection data in the standard energy window to be finally obtained.

Therefore, by performing Steps S3 to S5 of FIG. 3, TOF scatter projection data in the standard energy window is obtained. In Step S3 (calculation of the TOF direction distribution ratio), the ratio (P_low[t][$r_0$][$r_1$][θ][s]/Σ'P_low [t'][$r_0$][$r_1$][θ][s]) of a signal value in the non-TOF projection data obtained by integrating the second TOF projection data in the time division to the signal value in each of the second TOF projection data is calculated as a distribution ratio that distributes data for each time division.

On the other hand, in Step S4 (non-TOF scatter estimation algorithm), by performing scatter estimation processing (scatter estimation processing in the energy window method in this Embodiment 1) on the non-TOF projection data obtained by integrating the first TOF projection data in the time division, non-TOF scatter projection data (signal value array data $S_{NT}$[$r_0$][$r_1$][θ][s]=k×ΣP_low[t'][$r_0$][$r_1$][θ][s]) included in the standard energy window is generated. And, in Step S5 (calculation of TOF scatter projection data), by multiplying the signal value in the non-TOF scatter projection data and the distribution ratio, the projection data composed of a signal value obtained by multiplication is calculated as TOF scatter projection data (signal value array data $S_{TOF}$[t][$r_0$][$r_1$][θ][s]) which is scatter projection data for each time division included in the standard energy window.

As described in the "Means for Solving the Problems" section, by obtaining the distribution ratio from data (second TOF projection data) measured in the low energy window, scatter estimation can be performed accurately. Further, since the target of distribution is non-TOF scatter projection data in a standard energy window, post-distribution TOF scatter projection data can be obtained as approximate TOF scatter projection data in the standard energy window, which leads to accurate scatter estimation.

Note that random coincidence is included in the first TOF projection data and the second TOF projection data collected directly from the coincidence counting circuit 4. Therefore, in order to remove the random coincidence, in Step S1 (first TOF projection data generation), the TOF projection data obtained by subtracting TOF projection data of random coincidence from TOF projection data of prompt coincidence is generated as first TOF projection data. In the same manner, in order to remove the random coincidence, in Step S2 (second TOF projection data generation), the TOF projection data obtained by subtracting TOF projection data of random coincidence from TOF projection data of prompt coincidence is generated as second TOF projection data. Therefore, in Embodiment 1, in both steps of Step S1 (creation of the first TOF projection data) and Step S2 (creation of the second TOF projection data), TOF projection data of random coincidence is subtracted from TOF projection data of prompt coincidence, respectively.

Further, in this Embodiment 1, the scatter estimation processing in Step S4 (non-TOF scatter estimation algorithm) is scatter estimation processing in an energy window method of estimating the scattered radiation distribution using the reconstruction data energy window (standard energy window) and the scattered radiation energy window (low energy window).

According to the scatter estimation program 6 (see FIG. 1) according to Embodiment 1, by executing the scatter estimation method according to this Embodiment 1 by a computer (in each Embodiment, the GPU, the CPU or the programmable device constituting the arithmetic circuit 5 shown in FIG. 1), the distribution ratio is obtained from the second TOF projection data measured in the scattered radiation energy window (low energy window), and the target of distribution is the non-TOF scatter projection data in the reconstruction data energy window (standard energy window). Therefore, the post-distribution TOF scatter projection data can be obtained as approximate TOF scatter projection data in a reconstruction data energy window (standard energy window), which leads to accurate scatter estimation.

According to the PET apparatus 1 (see FIG. 1) according to this Embodiment 1, by providing the computing means (in each Embodiment, the GPU, the CPU or the programmable device constituting the arithmetic circuit 5 shown in FIG. 1) for executing the scatter estimation program 6 according to this Embodiment 1, the distribution ratio is obtained from the second TOF projection data measured in the scattered radiation energy window (low energy window), and the target of distribution is the non-TOF scatter projection data in the reconstruction data energy window (standard energy window). Therefore, the post-distribution TOF scatter projection data can be obtained as approximate TOF scatter projection data in a reconstruction data energy window (standard energy window), which leads to accurate scatter estimation.

EMBODIMENT 2

Figure 4:
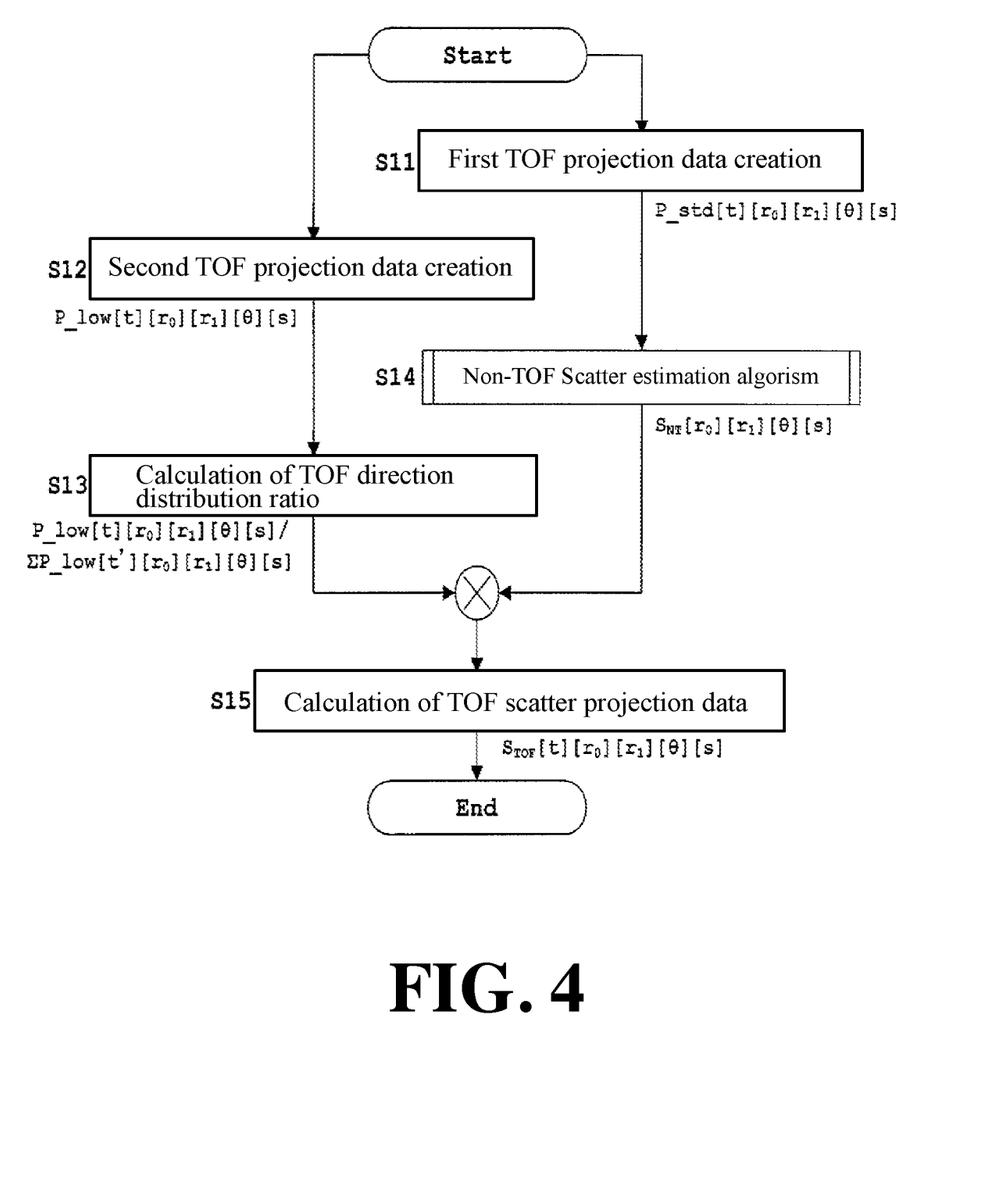
FIG. 4 is a flowchart showing the processing procedure and the flow of data of the scatter estimation method according to Embodiment 2.
Figure 5:
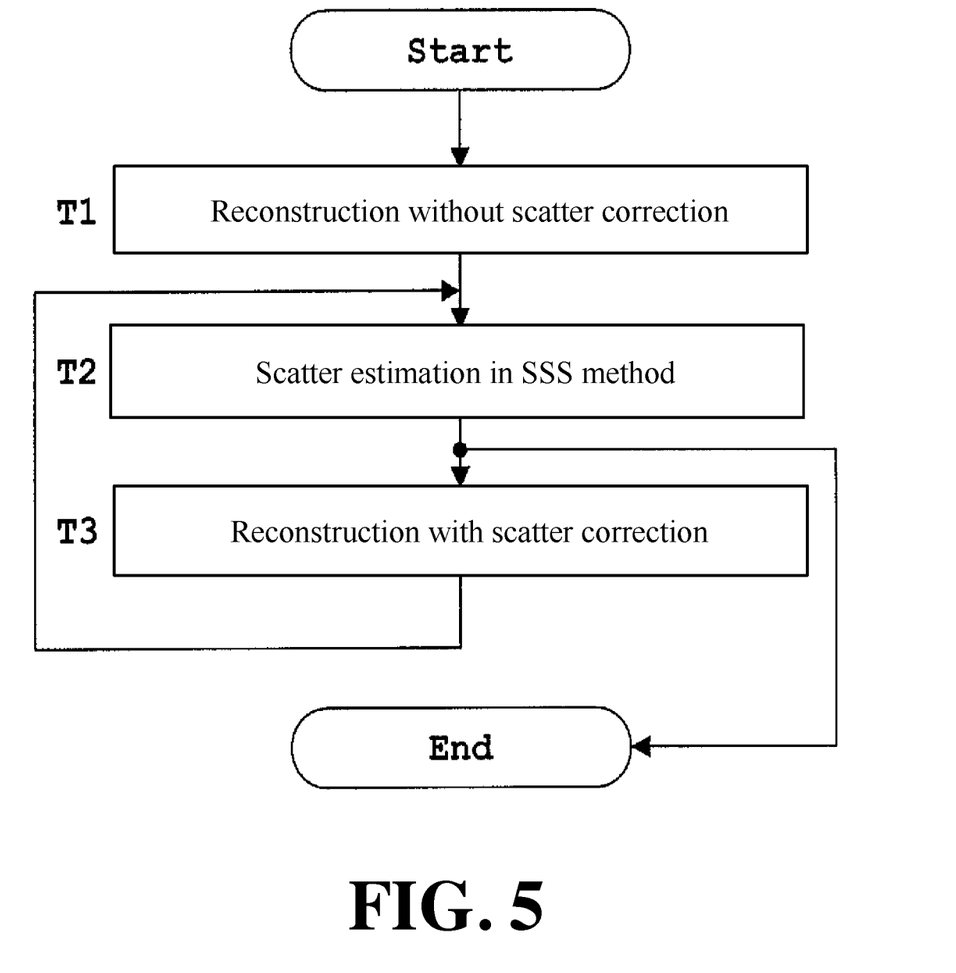
FIG. 5 is a flowchart of scatter estimation processing in a single scatter simulation method in a non-TOF scatter estimation algorithm of the scatter estimation method according to Embodiment 2.

Hereinafter, Embodiment 2 of the present invention will be described with reference to the drawings. FIG. 4 is a flowchart showing the processing procedure and the flow of data of the scatter estimation method according to Embodiment 2, and FIG. 5 is a flowchart of scatter estimation processing in a single scatter simulation method in a non-TOF scatter estimation algorithm according to Embodiment 2.

In the above-mentioned Embodiment 1, as a non-TOF scatter estimation algorithm, scatter estimation processing in an energy window method was performed. On the other hand, in this Embodiment 2, as a non-TOF scatter estimation algorithm, scatter estimation processing in a single scatter simulation (SSS) method is performed.

(Step S11) Generation of First TOF Projection Data

Step S11 of FIG. 4 is the same as Step S1 of the above-described Embodiment 1, and therefore the description thereof will be omitted. Step S11 corresponds to the first TOF projection data generation step in the present invention.

(Step S12) Generation of Second TOF Projection Data

Step S12 of FIG. 4 is the same as Step S2 of the above-described Embodiment 1, and therefore the description thereof will be omitted. Step S12 corresponds to the second TOF projection data generation step in the present invention.

(Step S13) Calculation of the TOF Direction Distribution Ratio

Step S13 of FIG. 4 is the same as Step S3 of the above-described Embodiment 1, and therefore the description thereof will be omitted. Step S13 corresponds to the distribution ratio calculation step in the present invention.

(Step S14) Non-TOF Scatter Estimation Algorithm

Scatter estimation processing (non-TOF scatter estimation algorithm) is performed on the non-TOF projection data obtained by integrating the first TOF projection data generated in Step S11 in the time division of the TOF information. As described above, the non-TOF scatter estimation algorithm will be described in this Embodiment 2 by taking scatter estimation processing in a single scatter simulation method as an example.

The single scatter simulation method is a known method for estimating the scattered radiation distribution using a radioactivity distribution image and an attenuation coefficient image as input data. However, in this Embodiment 2, the single scatter simulation method will be conceptually described.

In the single scatter simulation (SSS) method, the scattered radiation distribution is estimated based on the theoretical formula (Klein-Nishina formula) of the Compton scattering, using a radioactivity distribution image and an attenuation coefficient image as input data. Here, although it is premised that the above-mentioned radioactivity distribution image is scatter correction completed, it is contradictory that the scatter corrected image is required to obtain the scatter distribution by an SSS method. Therefore, when the scattering distribution is actually obtained by the SSS method, Steps T2 to T3 of FIG. 5 are repeated.

The number of iterations is not particularly limited. When the preset number of iterations has been reached, Step S14 (non-TOF scatter estimation algorithm) of FIG. 4 may be ended. Alternatively, an operator may manually terminate Step S14 (non-TOF scatter estimation algorithm) of FIG. 4 by manually operating the termination of iterations in real time.

(Step T1) Reconstruction Without Scatter Correction

Reconstruction is performed on the non-TOF projection data obtained by integrating the first TOF projection data generated in Step S11 of FIG. 4 in the time division of the TOF information. The processing in Step T1 is reconstruction without scatter correction.

(Step T2) Scatter Estimation by SSS Method

By a single scatter simulation (SSS) method, the scattered radiation distribution is estimated using the radioactivity distribution image reconstructed in Step T1 and the attenuation coefficient image as input data. For the specific method of the single scatter simulation (SSS) method, please refer to the aforementioned Patent Document 2: U.S. Pat. No. 7,397,035 and Non-Patent Document 3 (X Jin et al., "List-mode reconstruction for the biograph mCT with physics modeling and event-by-event motion correction", Phys. Med. Biol. 58 (2013) 5567-5591).

(Step T3) Reconstruction with Scatter Correction

Reconstruction is performed on the scattered radiation distribution (scatter sinogram) estimated in Step T2. The processing in Step T3 is reconstruction with scatter correction.

By repeating Steps T2 to T3 of FIG. 5 and completing the repetition, Step S14 (non-TOF scatter estimation algorithm) of FIG. 4 is terminated. Returning to the flowchart of FIG. 4, the following will be described. The estimated scatter sinogram obtained by the single scatter simulation (SSS) method corresponds to the non-TOF scatter projection data included in the standard energy window, similarly to the above-mentioned Embodiment 1. The signal value array data in this non-TOF scatter projection data is set as $S_{NT}[r_0][r_1][\theta][s]$.

Note that, in the energy window method of Embodiment 1 mentioned above, although the second TOF projection data (data set in the low energy window) was used, in the single scatter simulation (SSS) method of this Embodiment 2, as is apparent from the flowchart of FIG. 4, the second TOF projection data (data set in the low energy window) is not used. In the single scatter simulation (SSS) method of this Embodiment 2, the non-TOF scatter projection data (estimated scatter sinogram) included in the standard energy window can be estimated using only the first TOF projection data (data set in the standard energy window). Step S14 corresponds to the non-TOF scatter projection data generation step in the present invention.

(Step S15) Calculation of TOF Scatter Projection Data

Step S15 of FIG. 4 is the same as Step S5 of the above-described Embodiment 1, and therefore the description thereof will be omitted. Step S15 corresponds to the TOF scatter projection data calculation step in the present invention.

Similar to the above-mentioned Embodiment 1, the order of Steps S11 and S14 and Steps S12 and S13 is not particularly limited. Steps S11 and S14 may be performed after Steps S12 and S13, or Steps S11 and S14 may be performed in parallel with Steps S12 and S13. In the case of this Embodiment 2, in Step S14, without using the second TOF projection data in the scattered radiation energy window (low energy window) generated in Step S12, only the first TOF projection data in the same reconstruction data energy window (standard energy window) generated in Step S11 is used. Therefore, Steps S12 and S13 may be performed after Steps S11 and S14.

According to the scatter estimation method of this Embodiment 2, similar to the above-mentioned Embodiment 1, the distribution ratio is obtained from the second TOF projection data measured in the scattered radiation energy window (low energy window), and the target of distribution is the non-TOF scatter projection data in the reconstruction data energy window (standard energy window). Therefore, the post-distribution TOF scatter projection data can be obtained as approximate TOF scatter projection data in a reconstruction data energy window (standard energy window), which leads to accurate scatter estimation.

Also, in this Embodiment 2, the scatter estimation processing in Step S14 (non-TOF scatter estimation algorithm) is scatter estimation processing in the energy window method that estimates the scattered radiation distribution using a radioactivity distribution image and an attenuation coefficient image as input data. In the above-mentioned Embodiment 1, the second TOF projection data measured in the scattered radiation energy window (low energy window) was used. However, in this Embodiment 2, only the first TOF projection data measured in the same reconstruction data energy window (standard energy window) is used to estimate the non-TOF scatter projection data (estimated scatter sinogram) included in the standard energy window. Therefore, as compared with the above-described Embodiment 1, there is also an effect that scatter estimation can be performed more accurately.

The functions and effects of the scatter estimation program 6 (see FIG. 1) according to this Embodiment 2 and the PET apparatus 1 (see FIG. 1) according to this Embodiment 2 are the same as those of the above-mentioned Embodiment 1 and will not be described.

The present invention is not limited to the aforementioned embodiments, and can be modified as follows.

(1) In each of the above-described embodiments, the subject to be imaged is not particularly limited. The present invention may be applied to an apparatus for imaging an entire body of a subject, an apparatus for imaging a head of a subject, and an apparatus for imaging a breast of a subject.

(2) In each of the above-described embodiments, although the DOI detector is used, the present invention may be applied to a detector that does not discriminate the depth direction.

(3) In each of the above-described embodiments, the detector ring is stacked along the body axis direction of the subject. However, the detector ring may have only one detector ring.

(4) In each of the embodiments described above, the data format is a sinogram, but the present invention is not limited to a sinogram. As long as it is projection data, for example, the data format may be a histogram.

(5) In the above-described Embodiment 1, the non-TOF scatter projection data was generated using the energy window method, and in the above-described Embodiment 2, the non-TOF scatter projection data was generated using the single scatter simulation method. However, as for the scatter estimation processing for non-TOF projection data, it is not limited to these methods. For example, non-TOF scatter projection data may be generated using a convolution method.

INDUSTRIAL APPLICABILITY

As described above, the present invention is suitable for scatter estimation for a TOF measurement PET apparatus.

DESCRIPTION OF REFERENCE SYMBOLS

1: PET apparatus
3: γ-ray detector
5: arithmetic circuit
6: scatter estimation program
$P\_std[t][r_0][r_1][\theta][s]$: first TOF projection data
$P\_low[t][r_0][r_1][\theta][s]$: second TOF projection data
$S_{NT}[r_0][r_1][\theta][s]$: non-TOF scatter projection data
$S_{TOF}[t][r_0][r_1][\theta][s]$: TOF scatter projection data

The invention claimed is:

1. A scatter estimation method for measurement data of a positron CT, comprising:
a first TOF projection data generation step of generating first TOF projection data which is projection data for each time division by allocating detection signal data measured in a reconstruction data energy window set to obtain reconstruction data obtained by the positron CT to each time division of TOF information which is a detection time difference of two annihilation radiations that have reached detectors;
a second TOF projection data generation step of generating second TOF projection data which is projection data for each time division by allocating detection signal data measured in a scattered radiation energy window having center energy lower than center energy in the reconstruction data energy window for each time division;
a distribution ratio calculation step of calculating a ratio of a signal value in non-TOF projection data, which is obtained by integrating the second TOF projection data in the time division, to a signal value in each of the second TOF projection data as a distribution ratio that distributes data for each time division;
a non-TOF scatter projection data generation step of generating non-TOF scatter projection data included in the reconstruction data energy window by performing scatter estimation processing on non-TOF projection data obtained by integrating the first TOF projection data in the time division; and
a TOF scatter projection data calculation step of calculating projection data composed of a signal value obtained by multiplying a signal value in the non-TOF scatter projection data and the distribution ratio as TOF scatter projection data which is scatter projection data for each time division included in the reconstruction data energy window.

2. The scatter estimation method as recited in claim 1, wherein, in the first TOF projection data generation step, TOF projection data obtained by subtracting TOF projection data of random coincidence from TOF projection data of prompt coincidence is generated as the first TOF projection data.

3. The scatter estimation method as recited in claim 1, wherein, in the second TOF projection data generation step, TOF projection data obtained by subtracting TOF projection data of random coincidence from TOF projection data of prompt coincidence is generated as the second TOF projection data.

4. The scatter estimation method as recited in claim 1, wherein the scatter estimation processing in the non-TOF scatter projection data generation step is the scatter estimation processing in an energy window method for estimating scattered radiation distribution using the reconstruction data energy window and the scattered radiation energy window.

5. The scatter estimation method as recited in claim 1, wherein the scatter estimation processing in the non-TOF scatter projection data generation step is the scatter estimation processing in a single scatter simulation method for estimating scattered radiation distribution using a radioactivity distribution image and an attenuation coefficient image as input data.

6. A non-transitory computer readable medium having a program stored therein that is readable by a machine, the program executable by the machine to perform a scatter estimation method for measurement data of a positron CT, the method comprising:
a first TOF projection data generation step of generating first TOF projection data which is projection data for each time division by allocating detection signal data measured in a reconstruction data energy window set to obtain reconstruction data obtained by the positron CT to each time division of TOF information which is a detection time difference of two annihilation radiations that have reached detectors;
a second TOF projection data generation step of generating second TOF projection data which is projection data for each time division by allocating detection signal data measured in a scattered radiation energy window having center energy lower than center energy in the reconstruction data energy window for each time division;
a distribution ratio calculation step of calculating a ratio of a signal value in non-TOF projection data, which is obtained by integrating the second TOF projection data in the time division, to a signal value in each of the second TOF projection data as a distribution ratio that distributes data for each time division;
a non-TOF scatter projection data generation step of generating non-TOF scatter projection data included in the reconstruction data energy window by performing scatter estimation processing on non-TOF projection data obtained by integrating the first TOF projection data in the time division; and
a TOF scatter projection data calculation step of calculating projection data composed of a signal value obtained by multiplying a signal value in the non-TOF scatter projection data and the distribution ratio as TOF scatter projection data which is scatter projection data for each time division included in the reconstruction data energy window.

7. A positron CT apparatus comprising:
non-transitory computer readable medium of claim 6 having the program stored therein, and
computing means configured to execute the program.

* * * * *